US008708362B2

(12) United States Patent
Terpsma et al.

(10) Patent No.: US 8,708,362 B2
(45) Date of Patent: Apr. 29, 2014

(54) AUTOMATIC LOCK SYSTEM FOR VEHICLE HITCH ASSEMBLY

(71) Applicant: SAF-HOLLAND, Inc., Holland, MI (US)

(72) Inventors: Eric Terpsma, Holland, MI (US); Richard T. Polanic, Hudsonville, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 13/760,454

(22) Filed: Feb. 6, 2013

(65) Prior Publication Data
US 2013/0221635 A1  Aug. 29, 2013

Related U.S. Application Data

(60) Provisional application No. 61/604,672, filed on Feb. 29, 2012.

(51) Int. Cl.
B60D 1/02 (2006.01)
(52) U.S. Cl.
USPC .......................................................... 280/515

(58) Field of Classification Search
USPC .......................................................... 280/515
See application file for complete search history.

(56) References Cited

U.S. PATENT DOCUMENTS 3,190,677 A * 6/1965 Robbins ......................... 280/515
7,398,987 B2   7/2008 Roe et al.
8,336,902 B2 * 12/2012 Terpsma et al. ............... 280/515
8,540,270 B2 *  9/2013 Terpsma et al. ............... 280/515

* cited by examiner

Primary Examiner — Tony Winner
(74) Attorney, Agent, or Firm — Price Heneveld LLP

(57) ABSTRACT

A hitch coupler includes a frame having vertically spaced apart plates extending outwardly therefrom. Each plate includes a pin receiving aperture adapted to receive a pin member therethrough. The pin member is moveable between extended and retracted positions. The pin member includes a pin housing having a vertical guide slot disposed thereon. A lock mechanism is pivotally coupled to the frame member and includes a locking flange which is adapted to engage the guide slot when the pin member is in the extended position. The lock mechanism is biased towards a lock position such that the locking flange of the lock mechanism is adapted to automatically engage the guide slot disposed on the pin housing of the pin member when the guide slot is aligned with the locking flange of the lock mechanism. In the locked position, the locking mechanism acts to retain the pin member in the extended position.

20 Claims, 5 Drawing Sheets

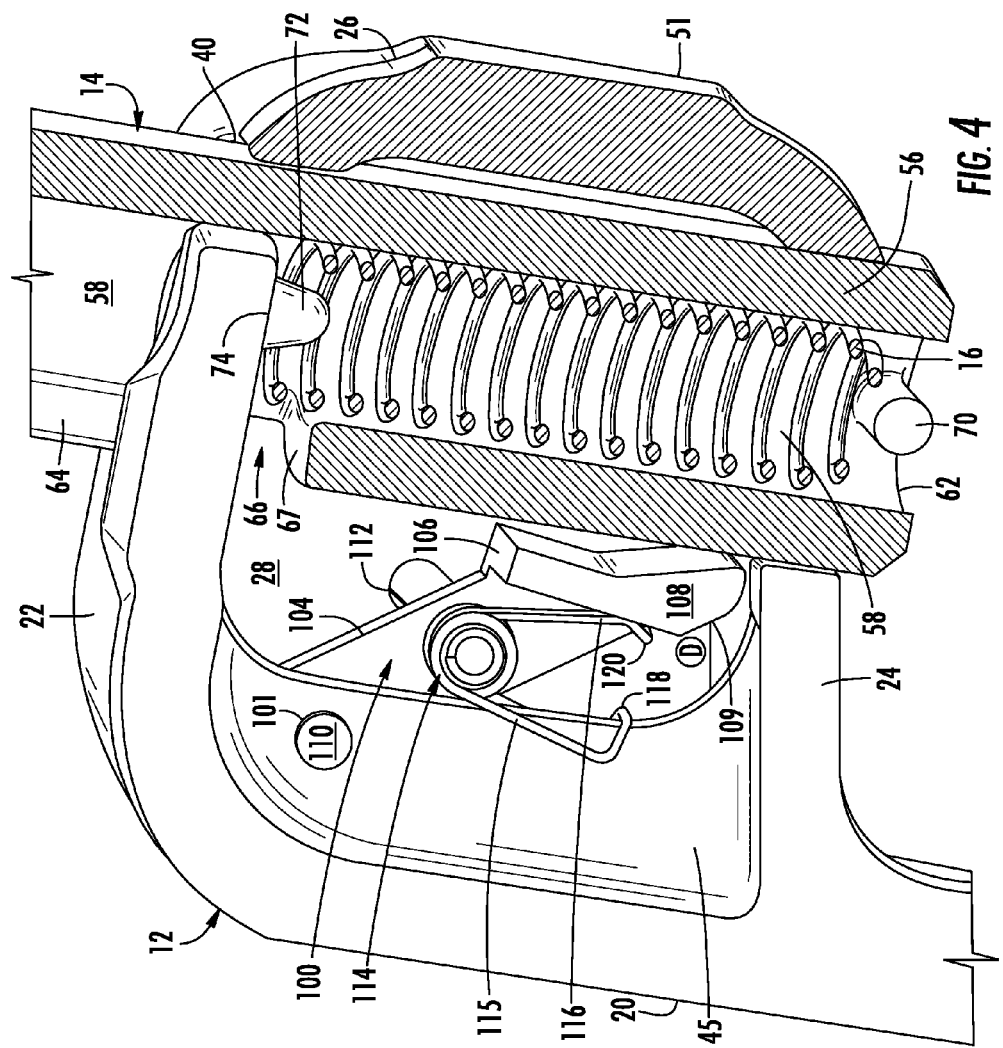

AUTOMATIC LOCK SYSTEM FOR VEHICLE HITCH ASSEMBLY

CROSS-REFERENCE TO RELATED APPLICATION

This application claims priority to and the benefit under 35 U.S.C. §119(e) of U.S. Provisional Patent Application No. 61/604,672, filed on Feb. 29, 2012, entitled "AUTOMATIC LOCK SYSTEM FOR VEHICLE HITCH ASSEMBLY," the entire disclosure of which is hereby incorporated by reference.

BACKGROUND OF THE INVENTION

The present invention generally relates to a trailer hitch coupler, and, more particularly, to a trailer hitch coupler that includes a vertically movable pin for engaging a drawbar eye of a trailer or like apparatus to be towed, wherein a biased lock mechanism is adapted to automatically engage a guide slot disposed on a pin housing to lock the pin in an extended position.

SUMMARY OF THE INVENTION

One aspect of the present invention includes a hitch coupler having a frame member, wherein the frame member includes a plurality of vertically spaced apart plates which extend outwardly from the frame member. Each plate includes an aperture disposed therethrough. A pin member is slidably received within the apertures of the vertically spaced apart plates, such that the pin member is moveable between an extended position and a retracted position relative to the frame member. The pin member includes a pin housing having a guide slot disposed thereon. A lock mechanism is pivotally coupled to the frame member such that the lock mechanism is pivotally moveable between a locked position and an unlocked position. The lock member is adapted to align with and engage the guide slot of the pin housing when the pin member is in the extended position and the lock mechanism is the locked position to thereby lock the pin in the extended position.

Another aspect of the present invention includes a hitch coupler having a frame member which includes a top plate, a bottom plate and a middle plate which is disposed between the top plate and the bottom plate. Each plate extends outwardly from the frame member and further includes a pin receiving aperture disposed thereon. A pin member having a pin housing and a handle portion is slidably received within the pin receiving apertures of the top, bottom and middle plates, such that the pin member is slidable between an extended position and a retracted position. A guide slot is disposed along a portion of the pin housing. A guide member extends laterally from the top plate, such that the guide member is slidably received within the guide slot of the pin housing. In this way, the guide member guides the pin member as the pin member moves between the extended position and the retracted position. A lock mechanism is pivotally coupled to the frame member and is moveable between a lock position and an unlocked position. The lock mechanism is adapted to align with and engage the guide slot of the pin housing when the pin member is in the extended position thereby retaining the pin member in the extended position.

In yet another aspect of the present invention includes a frame member having a plurality of vertically spaced apart plates extending outwardly from the frame member. Each plate includes a pin receiving aperture disposed therethrough. A pin member having a pin housing is slidably received within the pin receiving apertures such that the pin member is slidably between an extended position and a retracted position. A guide slot is disposed vertically along a portion of the pin housing. A guide member extends laterally from the frame member, such that the guide member is substantially disposed within an upper pin receiving aperture disposed on a top plate of the frame member. The guide member is adapted to be slidably received within the guide slot of the pin housing to guide the pin member between the extended position and the retracted position. A lock mechanism is pivotally coupled to the frame member and is moveable between a locked position and an unlocked position. The lock mechanism is adapted to align with and engage the guide slot of the pin housing when the pin member is in the extended position to retain the pin member in the extended position.

These and other advantages of the present invention will be further understood and appreciated by those skilled in the art by reference to the following written specification and appended drawings.

BRIEF DESCRIPTION OF THE DRAWINGS

FIG. 4 is a fragmentary cross-sectional perspective view of the hitch coupler taken along line IV-IV, FIG. 1A.

DETAILED DESCRIPTION OF THE PREFERRED EMBODIMENTS

Figure 1:
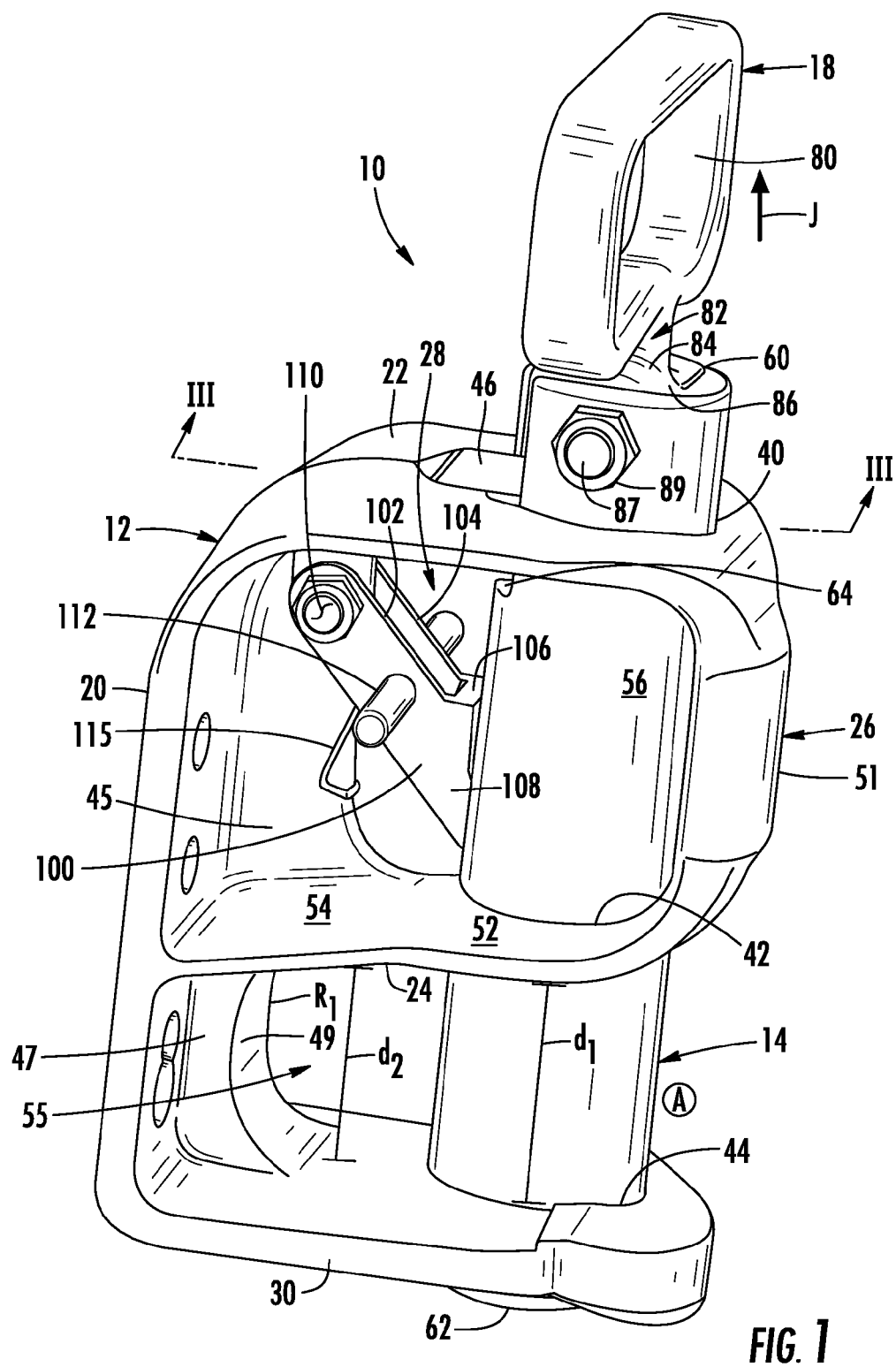
FIG. 1 is a front perspective view of a hitch coupler embodying the present invention.

For purposes of description herein, the terms "upper," "lower," "right," "left," "rear," "front," "vertical," "horizontal," "top," "bottom," and derivatives thereof shall relate to the invention as shown in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claim. Hence, specific dimensions, proportions, and other physical characteristics relating to the embodiment disclosed herein are not to be considered as limiting, unless the claim expressly states otherwise.

The reference numeral 10 (FIG. 1) generally designates a hitch coupler embodying the present invention. In the illustrated example, the hitch coupler includes a frame 12, a vertically moving pin 14 movable between extended and retracted positions, a spring member 16 (FIG. 3) biasing the pin 14 to the extended position within the frame 12, a handle member 18 provided so as to allow an operator to move the pin 14 within the frame 12 between the extended position A (FIG. 1) and the retracted position B (FIG. 1A), and a lock mechanism 100 adapted to lock the pin 14 in the extended position as further described below.

The frame 12 (FIGS. 1 and 1A) includes a back plate 20, a top plate 22 integrally connected to and extending from an upper portion of the back plate 20, a middle plate 24 integrally connected to and extending from the back plate 20 at a position that is spaced below the top plate 22, a front plate 26 integrally connected to and extending between distal ends of the top plate 22 and the middle plate 24, such that the top plate 22, the middle plate 24 and the front plate 26 cooperate to define an interior space 28 in which lock mechanism 100 is disposed. The frame 12 further comprises a bottom plate 30 integrally connected to and extending from a lower portion of the back plate 20 at a position spaced below the middle plate 24.

Figure 2:
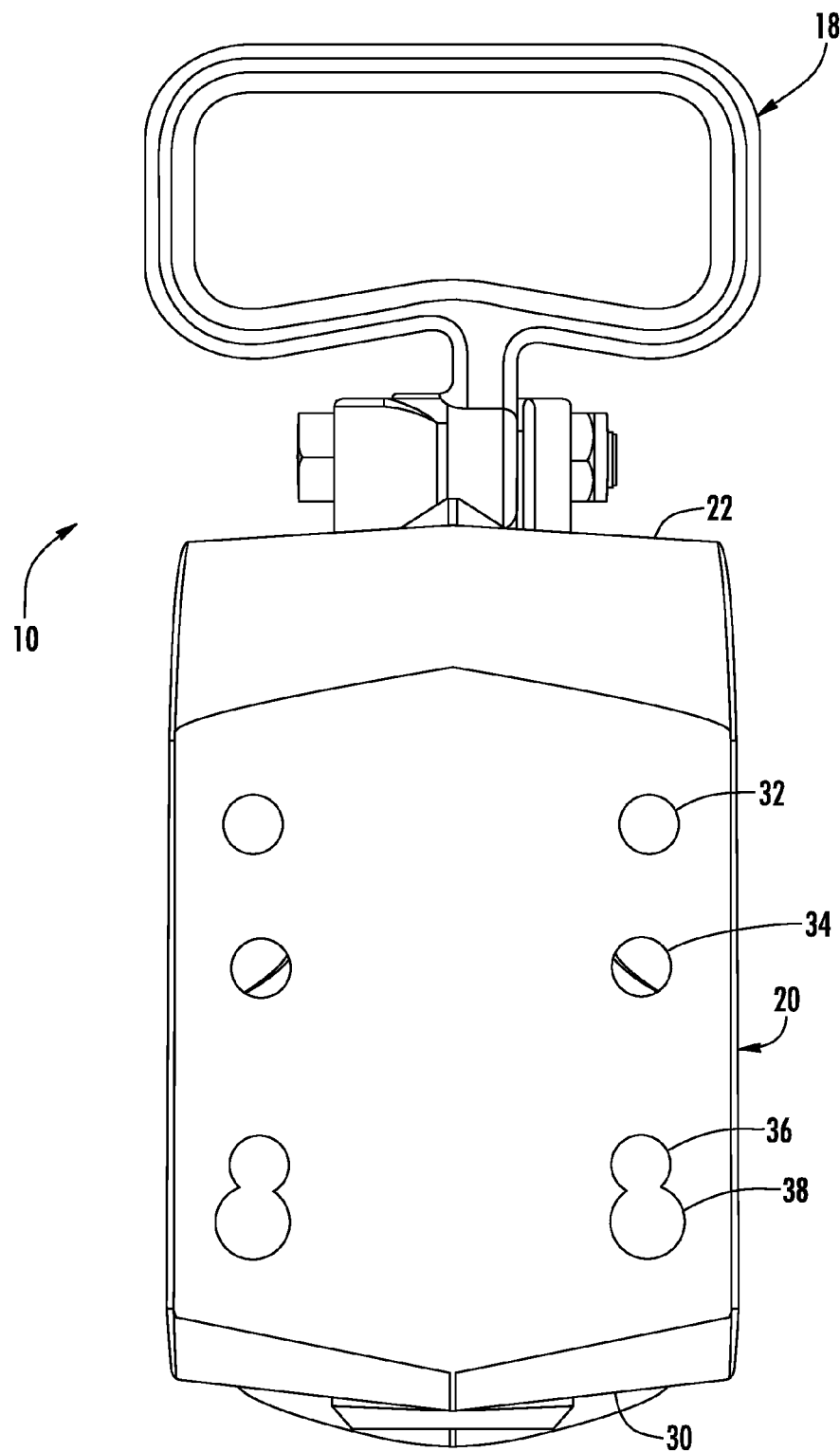
FIG. 2 is a rear elevational view of the hitch coupler.

As best illustrated in FIG. 2, the back plate 20 includes a plurality of apertures adapted to receive mechanical mounting hardware therein, such as bolts or other like fasteners for securing the overall hitch coupler 10 to an associated towing vehicle. The apertures include a first pair of apertures 32 extending through the back plate 20 and each having a first diameter, a second pair of apertures 34 extending through the back plate 20 and each having a second diameter that is substantially similar to the first diameter, the second pair of apertures 34 being spaced below and located inwardly of the first pair of apertures 32, a third pair of apertures 36 extending through the back plate 20 and each having a third diameter that is substantially similar to the first diameter, the third pair of apertures 36 being spaced below the second pair of apertures 34 and located inwardly of the first pair of apertures 32, and a fourth pair of apertures 38 extending through the back plate 20 and each having a fourth diameter that is larger than the first diameter, the fourth pair of apertures 38 overlapping the third pair of apertures 36 and aligned with the first pair of apertures 32. The present inventive bolt patterning creates a universal hitch arrangement allowing the hitch coupler 10 to be utilized with vehicles or other hitches patterned for PH30 or E-hitch type assemblies and other mounting patterns known in the art.

Referring again to FIG. 1, the top plate 22 includes an aperture 40, the middle plate 24 an aperture 42, and the bottom plate 30 an aperture 44, wherein each aperture 40, 42, 44 is a pin receiving aperture adapted to slidably receive the pin 14 therethrough. The top plate 22 (FIG. 3) includes a protrusion 46, which is in the form of a prismatic protrusion in this embodiment, extending upwardly therefrom, and a guide member 48 extending into the aperture 40. The protrusion 46 is adapted to secure the pin 14 in the retracted position (FIG. 1A), while the guide member 48 is adapted to guide the pin 14 as the pin 14 is moved between the retracted position B and an extended position A (FIG. 1), as described below. The front plate 26 includes a rounded or arcuately-shaped outer surface 51 that extends outwardly from an outermost portion of the bottom plate 30, and is adapted to deflect the collision of a cooperating drawbar assembly, thereby protecting the pin 14, the spring 16, the handle member 18, and other components of the hitch coupler 10 from damage. The middle plate 24 (FIG. 1A) includes an upper portion 52 and a downwardly angled lower portion 54, such that the distance $d_1$, as defined between the proximal ends of the middle plate 24 and the bottom plate 30, is less than the distance $d_2$, as defined between the distal ends of the middle plate 24 and the bottom plate 30, thereby forcing a coupled portion of a drawbar into a particular, more restricted location within the gap 55 created between the middle plate 24 and the bottom plate 30. This restricted movement of the drawbar with respect to the hitch coupler 10 provides increased control of the towed vehicle/trailer and reduces the wear of associated components. A structural reinforcement rib 45 extends forwardly from the back plate 20 and vertically between the top plate 22 and the middle plate 24. This reinforcement rib 45 serves as a pivoted coupling point for the lock mechanism 100 as further described below. A second reinforcement rib 47 extends forwardly from the back plate 20 and vertically between the middle plate 24 and the bottom plate 30. A forwardly facing surface 49 is provided an arcuate shape having a radius $R_1$ substantially similar to the radius of a coupled portion of a trailer drawbar, thereby limiting movement between the hitch coupler 10 and the drawbar, also resulting in better control of the towed vehicle/trailer and less wear to associated components.

Figure 3:
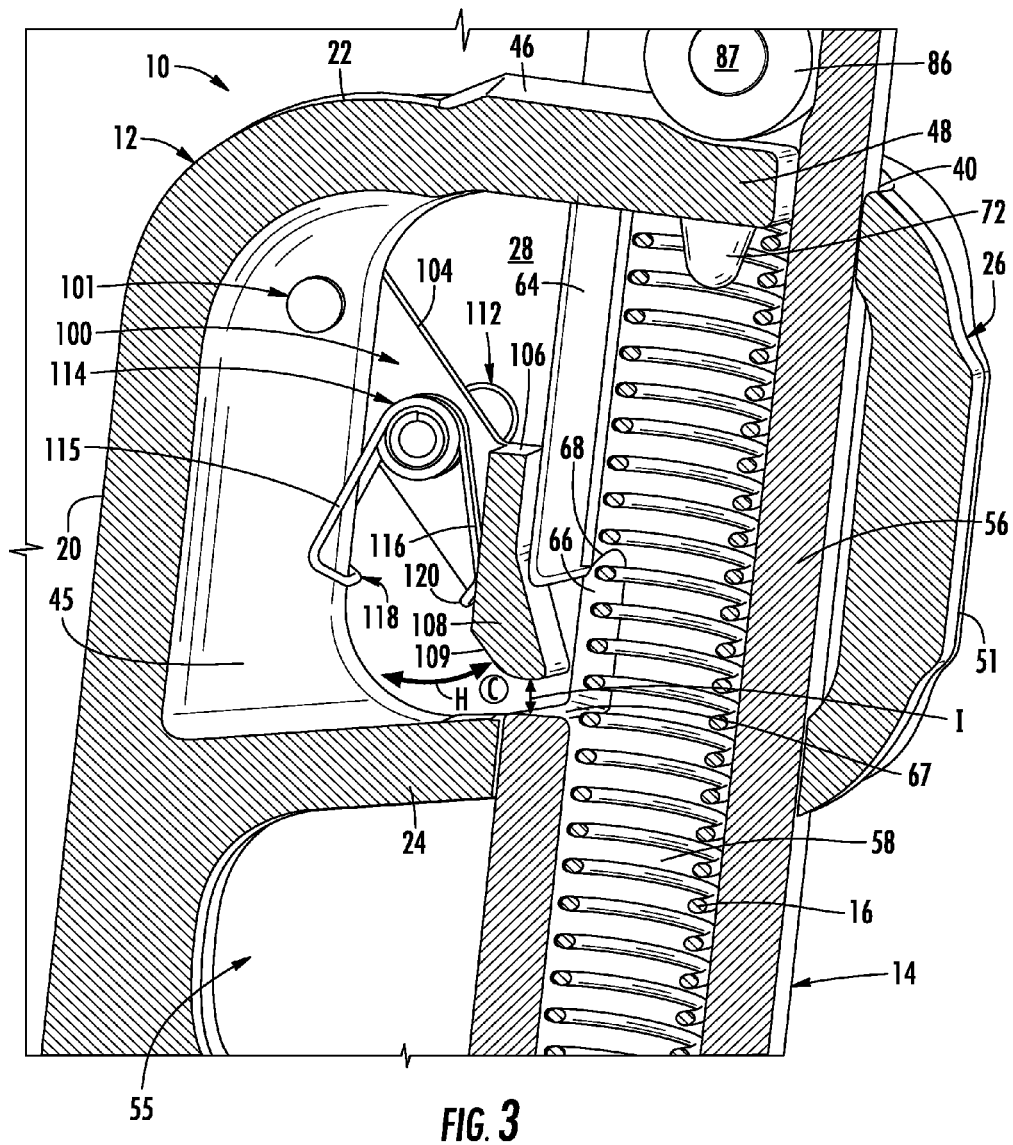
FIG. 3 is a fragmentary cross-sectional perspective view of the hitch coupler taken along line III-III, FIG. 1.

As shown in FIG. 3, the pin 14 includes a cylindrical housing 56 which defines a hollow interior space 58 housing a biasing mechanism or spring 16. The pin 14 includes an opening top end 60 (FIG. 1) and an open bottom end 62 (FIG. 4), thereby allowing water and debris to drain from the interior space 58. The housing 56 of the pin 14 includes a longitudinally extending guide slot 64 extending from the top end 60 to an intermediate position disposed along the length of the housing 56. A bottom end 67 of the guide slot 64 includes a circumferentially laterally extending slot 66 or offset portion having an upper surface 68, which is in the form of a triangularly-shaped upper surface in this embodiment, which is adapted to receive the protrusion 46 of the frame 12 therein.

As best illustrated in FIGS. 3 and 4, a first embodiment of the spring member 16 includes a cylindrically shaped coil spring seated about a lower boss 70 disposed in a lower end of the housing 56 and a upper boss 72 extending downwardly from and integrally formed into a lower surface 74 of the top plate 22. Alternatively, the spring member 16 may include a conically-shaped coil spring which is self-centering within the pin 14.

The lock mechanism 100 (FIG. 1) is a biased lock mechanism which engages the guide slot 64 in the pin housing 56 in operation. The lock mechanism 100 is shown in the embodiment of FIG. 1 as a generally U-shaped mechanism comprising bracket members 102, 104 and a lock member 106 having a locking flange 108. As shown in FIG. 1, the bracket members 102, 104 are disposed on either side of structural reinforcement rib 45. Reinforcement rib 45 includes an aperture 101 (FIG. 3) that aligns with apertures disposed on upper portions of bracket members 102, 104. A fastener assembly 110 is disposed in aperture 101 of reinforcement rib 45 as well as the apertures of the bracket members 102, 104 to create a pivoted coupling of the lock mechanism 100 to the reinforcement rib 45. In this way, the lock mechanism 100 is pivotally movable between an extended or locked position C (shown in FIGS. 1 and 3), and a retracted or unlocked position D (shown in FIGS. 1A and 4). Relative movement of the lock mechanism 100 is indicated by arrow H in FIG. 3.

As shown in FIG. 1, bracket members 102, 104 further comprise second apertures that are generally disposed in the middle of the bracket members 102, 104. A roll pin 112 is disposed in the second apertures for use as a handle in moving the lock mechanism 100 to the retracted or unlocked position D (FIG. 4). A return spring 114 has a coiled portion that engages roll pin 112 as well as first and second arm portions 115, 116. The first and second arm portions 115, 116 further comprise attachment flanges 118, 120, respectively, for coupling arm portion 115 to reinforcement rib 45 and arm portion 116 to either of the bracket members 102, 104. The return spring 114 biases the lock mechanism 100 toward the extended or locked position C (FIG. 3). As shown in FIG. 3, locking flange 108 further comprises an angled rear surface 109 that further engages the lock member 106 in the locked position C when an operator tries to lift the pin 14. In this way, the angled surface 109 of the locking flange 108 provides a mechanical advantage that insures that the lock member 106 will continue to lock the pin 14 in the extended position when an upward force J (FIG. 1) is exerted on the handle 18. Under an upward force J, angled surface 109 of the locking flange 108 will create an increased engagement of the locking flange 108 within the guide slot 64 by contacting guide slot lower surface 67. Further, the return spring 114, as shown in the embodiment of FIGS. 3 and 4, is a double wound return spring which reduces the possibility of foreign object damage. A maximum amount of free play is indicated by arrow I (FIG. 3), and this amount of play or clearance allows the lock mechanism 100 to engage the guide slot 64 consistently when pin 14 is in an in-service or extended position.

In operation, an operator moves the pin 14 vertically between extended position A (FIG. 1) and retracted position B (FIG. 1A) by grasping roll pin 112 of the lock mechanism 100 and disengaging the locking flange 108 from the guide slot 64 by pulling the lock mechanism 100 to the retracted or unlocked position D. The operator then grasps the handle 18 of the pin 14 and applies an upward force, indicated by arrow J (FIG. 1), thereby overcoming the downwardly directed biasing force exerted by the spring member 16 onto the pin 14. The pin 14 is guided upward by the guide member 48 slidably guiding within the guide slot 64 of the housing 56. The lock mechanism 100 can be released as soon as the pin 14 has been raised enough to clear the locking flange 108 from the guide slot 64. The distal most edge of the locking flange 108 then contacts the housing 56 of the pin 14 as the pin 14 is moved upward. In this way, the compression of the return spring 114 is limited during pin movement.

The pin 14 may be secured in the retracted position B (FIG. 1A) by applying a rotational force $R_2$ to the handle 18, thereby turning the pin 14 within the aperture 40 until the upper surface 68 of the slot 66 of the housing 56 is vertically aligned with the protrusion 46 of the frame 12. The operator then releases the upward force J being exerted on the handle 18, thereby allowing the spring member 16 to force the pin 14 downwardly with respect to the frame 12 and bias the protrusion 46 into the upper surface 68 of slot 66. The engagement of the upper surface 68 with the guide member 48 holds the pin 14 in the retracted position B, thereby allowing an operator to position a drawbar within the gap 55 of the frame 12 without physically holding the pin 14 in the retracted position B. This positive engagement further prevents the pin 14 from being bumped or accidentally jarred into the extended position A by requiring the operator to again exert a force J to the pin 14 via the handle 18, apply a rotational force $R_2$ to the pin 14 to align the guide member 48 with the guide slot 64, and again release the force J thereby allowing the spring 16 to bias the pin 14 downward into the extended position A. It is noted that the protrusion 46 and the upper surface 68 may include other cross-sectional configurations that are reciprocal or complimentary to one another, or otherwise allow for a positive engagement of the upper surface 68 with the guide member 48 as discussed above.

To return the pin 14 to the extended position A, the handle 18 is lifted upwardly, as indicated by arrow J (FIG. 1), and rotated by applying a rotational force $R_2$ (FIG. 1A) to release the pin 14 from the protrusion 46 of frame 12. The biasing spring 16 will then bias the pin 14 downward to the extended position A, where the lock mechanism 100 will automatically engage the guide slot 64 disposed on the housing 56 of the pin 14. In this way, pin 14 provides a primary lock mechanism for a drawbar and the lock mechanism 100 provides a secondary and automatic lock mechanism to engage and retain the primary lock pin 14 in an extended position. Guide member 48 guides the movement of pin 14 downward toward the extended position by its engagement with the guide slot 64.

Figure 1A:
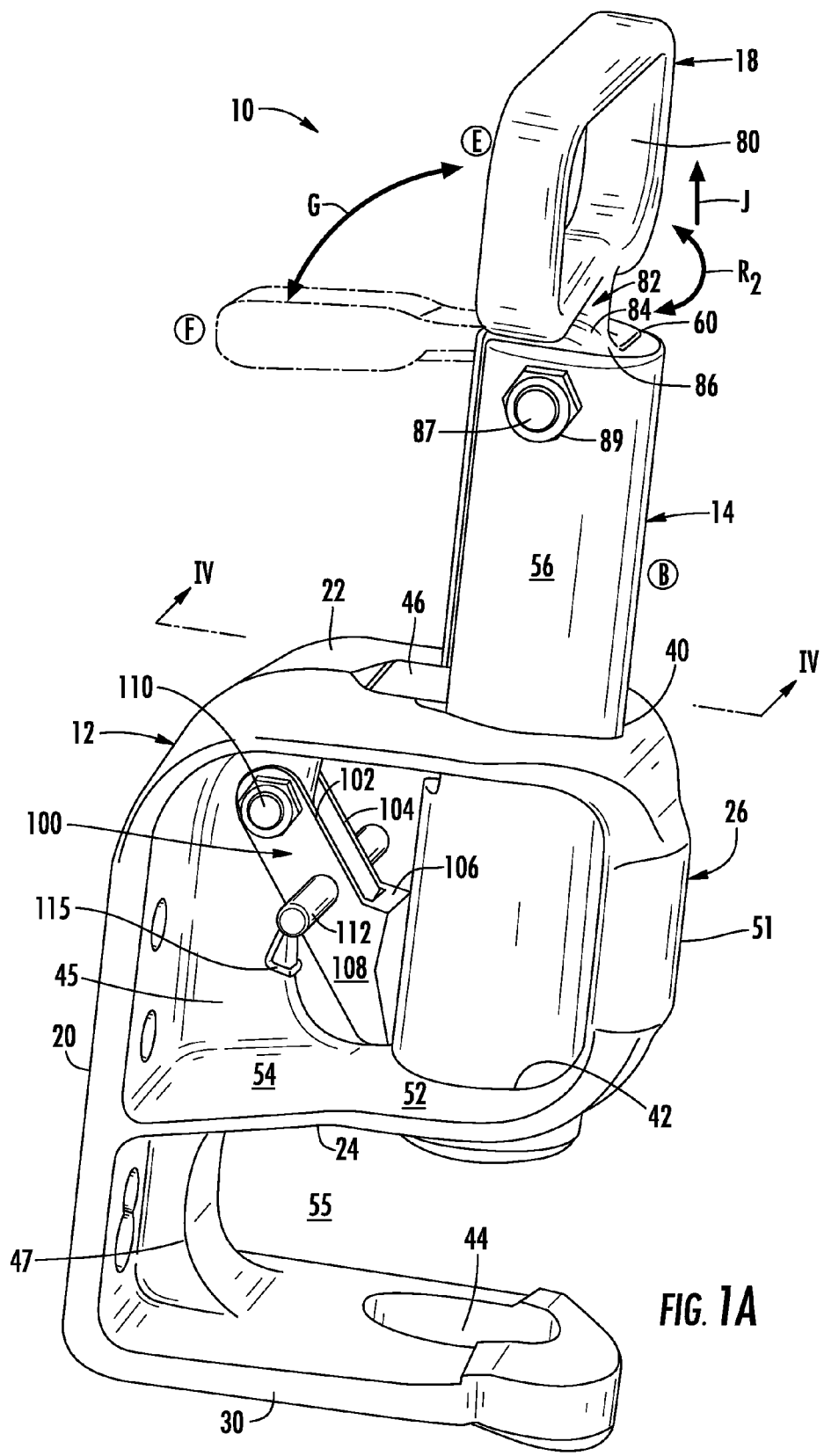
FIG. 1A is a front perspective view of the hitch coupler.

The handle member 18 (FIG. 1A) includes a loop-shaped grasping portion 80 and an attachment portion 82 integrally formed with and extending outwardly from the grasping portion 80. The attachment portion 82 includes a narrowed neck 84 and an enlarged base 86 that is received into the open end 60 of the housing 56 of the pin 14 and pivotally secured thereto by a bolt 87 and nut 89 combination extending through a pair of apertures disposed on an upper portion of the pin 14. It is further contemplated that the handle member 18 can be installed in a reverse orientation relative to the orientation shown in FIG. 1A, such that the handle member 18 remains upright as coupled to the pin 14, and is not pivotally connected thereto. In this way, the handle member 18 can be installed as a rigid upright or as a stowable member in the design of the present invention. The base 86 of the handle member 18 may include a stop member extending asymmetrically from the neck 84. In assembly, the handle 18 may be assembled with the pin 14 in a first configuration, wherein the stop member of the handle 18 is aligned with the guide slot 64 of the housing 56 of the pin 14, thereby providing clearance for the stop member and allowing the handle 18 to be rotated from an in use position E to a storage position F as indicated by arrow G (FIG. 1A).

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A hitch coupler, comprising:
a frame member including a plurality of vertically spaced apart plates extending outwardly therefrom, each plate having an aperture disposed therethrough;
a pin member slidably received within the apertures of the vertically spaced apart plates, the pin member moveable between an extended position and a retracted position, wherein the pin member includes a pin housing having a guide slot disposed thereon;
a lock mechanism pivotally coupled to the frame member, the lock mechanism moveable between locked and unlocked positions; and
wherein the lock mechanism is adapted to align with and engage the guide slot of the pin housing when the pin member is in the extended position to lock the pin member in the extended position.

2. The hitch coupler of claim 1, including:
a biasing mechanism coupled to the frame and the lock mechanism, the biasing mechanism adapted to bias the lock mechanism towards the locked position.

3. The hitch coupler of claim 2, wherein:
the pin housing is a generally cylindrical housing having a hollow interior portion.

4. The hitch coupler of claim 3, including:
a boss member disposed in a lower portion of the hollow interior portion.

5. The hitch coupler of claim 4, wherein:
the plurality of vertically spaced apart plates includes a top plate, a bottom plate and a middle plate disposed between the top plate and the bottom plate.

6. The hitch coupler of claim 5, including:
a guide member extending laterally from the top plate, wherein the guide member is substantially disposed within the aperture disposed on the top plate, and
further wherein the guide member is adapted to be received in the guide slot of the pin housing in assembly, thereby guiding vertical movement of the pin member between the extended and retracted positions.

7. The hitch coupler of claim 6, including:
a boss member disposed on the guide member;
a pin biasing mechanism engaged with and disposed between the boss member disposed on the guide member and the boss member disposed in the hollow interior portion of the pin housing; and wherein the pin biasing mechanism is adapted to bias the pin member to the extended position.

8. The hitch coupler of claim 7, including:

a handle portion pivotally coupled to an upper portion of the pin housing, wherein the handle portion is disposed above the guide member in assembly, and further wherein the handle portion is adapted to be engaged by a user to move the pin member to the retracted position.

9. The hitch coupler of claim 7, including:

a relief slot disposed adjacent to and opening into a lower portion of the guide slot, wherein the relief slot is adapted to engage a portion of the guide member when the pin member is in the retracted position to retain the pin member in the retracted position.

10. A hitch coupler, comprising:

a frame member including a top plate, a bottom plate and a middle plate disposed between the top plate and the bottom plate, each plate extending outwardly from the frame member and each plate further including a pin receiving aperture disposed thereon;

a pin member having a pin housing and a handle portion, the pin housing slidably received within the pin receiving apertures such that the pin member is slideable between an extended position and a retracted position;

a guide slot disposed along a portion of the pin housing;

a guide member extending laterally from the top plate, wherein the guide member is adapted to be slidably received within the guide slot of the pin housing to guide the pin member between the extended position and the retracted position;

a lock mechanism pivotally coupled to the frame member, the lock mechanism moveable between a locked position and an unlocked position; and wherein the lock mechanism is adapted to align with and engage the guide slot of the pin housing when the pin member is in the extended position to retain the pin member in the extended position.

11. The hitch coupler of claim 10, including:

a biasing mechanism coupled to the frame and the lock mechanism, the biasing mechanism adapted to bias the lock mechanism towards the locked position.

12. The hitch coupler of claim 11, wherein:

the pin housing is a generally cylindrical housing having a hollow interior portion.

13. The hitch coupler of claim 12, including:

a boss member disposed in a lower portion of the hollow interior portion of the pin housing.

14. The hitch coupler of claim 13, including:

a boss member disposed on the guide member;

a pin biasing mechanism engaged with and disposed between the boss member disposed on the guide member and the boss member disposed in the hollow interior portion of the pin housing; and wherein the pin biasing mechanism is adapted to bias the pin member to the extended position.

15. The hitch coupler of claim 14, including:

a relief slot disposed adjacent to and opening into a lower portion of the guide slot, wherein the relief slot is adapted to engage a portion of the guide member when the pin member is in the retracted position to retain the pin member in the retracted position.

16. A hitch coupler, comprising:

a frame member including a plurality of vertically spaced apart plates extending outwardly therefrom, each plate having a pin receiving aperture disposed therethrough;

a pin member having a pin housing, the pin housing slidably received within the pin receiving apertures such that the pin member is slideable between an extended position and a retracted position;

a guide slot disposed vertically along a portion of the pin housing;

a guide member extending laterally from the frame member, wherein the guide member is substantially disposed within an upper pin receiving aperture and adapted to be slidably received within the guide slot of the pin housing to guide the pin member between the extended position and the retracted position;

a lock mechanism pivotally coupled to the frame member, the lock mechanism moveable between a locked position and an unlocked position; and wherein the lock mechanism is adapted to align with and engage the guide slot of the pin housing when the pin member is in the extended position to retain the pin member in the extended position.

17. The hitch coupler of claim 16, including:

a spring member coupled to the frame and the lock mechanism, the spring member adapted to bias the lock mechanism towards the locked position.

18. The hitch coupler of claim 17, including:

a locking flange disposed on the lock mechanism, wherein the locking flange abuts the pin housing when the pin member is in the retracted position and further wherein the locking flange is adapted to be biased by the spring member into engagement with the guide slot of the pin housing as the pin member moves to the extended position; and an angled surface disposed on the locking flange, wherein the angled surface is adapted to bias the locking flange into further engagement with the guide slot when the lock mechanism is in the locked position as an upward force is realized on the pin member.

19. The hitch coupler of claim 18, including:

a biasing mechanism disposed within a hollow interior of the pin housing, the biasing mechanism operably coupled to a portion of the frame member at a first end and further operably coupled to the a lower portion of the pin housing at a second end; and wherein the biasing mechanism is adapted to bias the pin member towards the extended position.

20. The hitch coupler of claim 19, including:

a handle portion pivotally coupled to an upper portion of the pin housing, wherein the handle portion is disposed above the guide member in assembly, and further wherein the handle portion is adapted to be engaged by a user to move the pin member to the retracted position.

* * * * *